United States Patent [19]

Serini et al.

[11] Patent Number: 5,021,542

[45] Date of Patent: Jun. 4, 1991

[54] POLYCARBONATE OF POLYSUBSTITUTED CYCLOHEXYLIDENE BISPHENOLS

[75] Inventors: Volker Serini; Dieter Freitag; Karsten-Josef Idel, all of Krefeld; Uwe Westeppe, Mettmann; Ulrich Grigo, Kempen; Klaus-Christian Paetz, Burscheid, all of Fed. Rep. of Germany

[73] Assignee: Bayer Aktiengesellschaft, Bayerwerk, Fed. Rep. of Germany

[21] Appl. No.: 450,655

[22] Filed: Dec. 13, 1989

[30] Foreign Application Priority Data

Dec. 21, 1988 [DE] Fed. Rep. of Germany ....... 3842943
Aug. 12, 1989 [DE] Fed. Rep. of Germany ....... 3926767

[51] Int. Cl.$^5$ .............................................. C08G 64/06
[52] U.S. Cl. .................... 528/204; 528/171; 528/176; 528/196; 528/198; 528/202
[58] Field of Search ............... 528/204, 202, 196, 198, 528/171, 176

[56] References Cited

U.S. PATENT DOCUMENTS 4,304,899 12/1981 Mark et al. ........................... 528/171

Primary Examiner—Harold D. Anderson
Attorney, Agent, or Firm—Joseph C. Gil; Aron Preis

[57] ABSTRACT

Thermoplastic aromatic polycarbonates having average molecular weights $\overline{M}w$ of at least 10,000 which contain bifunctional carbonate structural units corresponding formula (I)

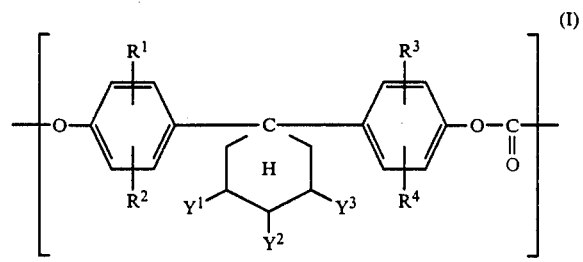

in which
$R^1$, $R^2$, $R^3$, $R^4$ independently of one another represent hydrogen, a $C_{1-12}$ hydrocarbon, halogen,
$Y^1$, $Y^2$, $Y^3$ independently of one another represent hydrogen, $C_{1-5}$ alkyl, a $C_{6-12}$ hydrocarbon radical,
at least two of the substituents $Y^1$, $Y^2$ and $Y^3$ not being hydrogen and at least one of the substituents $Y^1$, $Y^2$ and $Y^3$ being $C_{1-5}$ alkyl,
in quantities of from 100 to 1 mol-%, based on the total quantity of difunctional carbonate structural units in the polycarbonate.

3 Claims, No Drawings

POLYCARBONATE OF POLYSUBSTITUTED CYCLOHEXYLIDENE BISPHENOLS

This invention relates to thermoplastic aromatic polycarbonates having average molecular weights $\overline{M}w$ of at least 10,000, preferably in the range from 10,000 to 250,000, more preferably in the range from 10,000 to 120,000, most preferably in the range from 15,000 to 100,000 and more especially in the range from 20,000 to 80,000, which contain bifunctional carbonate structural units corresponding to formula (I)

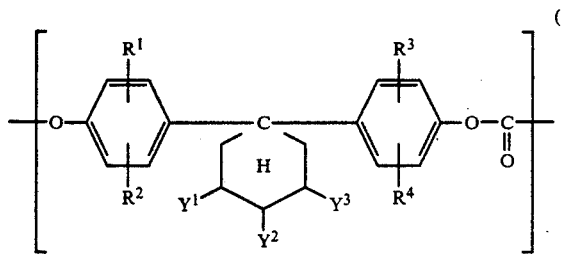

in which $R^1$, $R^2$, $R^3$, $R^4$ independently of one another represent hydrogen, a $C_{1-12}$ hydrocarbon, halogen, $Y^1$, $Y^2$, $Y^3$ independently of one another represent hydrogen, $C_{1-5}$ alkyl, a $C_{6-12}$ hydrocarbon radical, at least two of the substituents $Y^1$, $Y^2$ and $Y^3$ not being hydrogen and at least one of the substituents $Y^1$, $Y^2$ and $Y^3$ being $C_{1-5}$ alkyl,
in quantities of from 100 to 1 mol-%, preferably in quantities of from 100 to 5 mol-% and more preferably in quantities of from 100 to 20 mol-%, based on the total quantity of difunctional carbonate structural units in the polycarbonate. Of the above-mentioned polycarbonates containing 100 to 20 mol-% of bifunctional carbonate structural units corresponding to formula (I), those containing from 100 to 50 mol-% are preferred, those containing from 100 to 80 mol-% are particularly preferred and those containing 100 mol-% are more particularly preferred.

The polycarbonates according to the invention have surprising technological properties by comparison with known polycarbonates, for example of bisphenol A and of 1,4-bis-(4-hydroxyphenyl)-cyclohexane.

Thus, they have surprisingly high glass temperatures Tg, even for small contents of carbonate structural units corresponding to formula (I). They also show particularly good demolding behavior and exceptionally good melt flow particularly taking their high glass temperature Tg into account. In addition, the polycarbonates according to the invention are tracking-resistant and stable to hydrolysis, UV light and to heat ageing.

The carbonate structural units corresponding to formula (I) are based on biphenols corresponding to the following formula

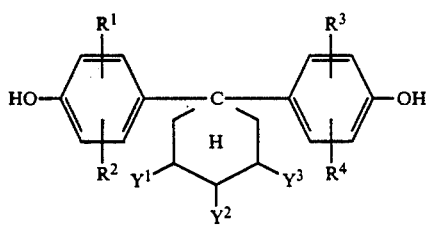

in which $R^1$, $R^2$, $R^3$, $R^4$, $Y^1$, $Y^2$ and $Y^3$ are as defined for formula (I).

In formulae (I) and (II), $R_1$, $R_2$, $R_3$, $R_4$ are preferably hydrogen, methyl, ethyl, phenyl, cyclohexyl, chlorine and bromine and, more preferably, hydrogen, methyl and bromine.

Where more than one of the substituents $R_1$, $R_2$, $R_3$ and $R_4$ is not hydrogen, the same substituents are preferred. Where two of the substituents $R_2$, $R_2$, $R_3$ and $R_4$ are not hydrogen, the O,O' substitution, based on the carbonate groups (formula (I)).or on the phenolic OH groups (formula (II)), is preferred. Where all four substituents $R_2$, $R_3$, $R_3$ and $R_4$ are not hydrogen, the O,O-,O',O'-substitution, on the same basis as before, is preferred.

In addition to hydrogen, $Y^1$, $Y^2$ and $Y^3$ in formulae (I) and (II) may be $C_{1-5}$ alkyl, for example n-alkyl, such as methyl, ethyl, propyl, butyl and pentyl, preferably ethyl and methyl, more preferably methyl, and iso-$C_{3-5}$-alkyl, such as isopropyl, tert.-butyl, 1-methylpropyl, 1,1-dimethylpropyl, 1-methylbutyl, 1,2-dimethylpropyl and 2,2-dimethylpropyl, preferably isopropyl, tert.-butyl, 1-methylpropyl and 1,1-dimethylpropyl, more preferably tert.-butyl and 1,1-dimethylpropyl and, most preferably tert.-butyl and also cyclopentyl.

In addition to hydrogen, $Y^1$, $Y^2$ and $Y^3$ in formulae (I) and (II) may also be $C_{6-12}$ hydrocarbon radicals, such as n-$C_{6-12}$ alkyl (for example hexyl, octyl, nonyl, decyl, dodecyl), iso-$C_{6-12}$-alkyl (for example various isohexyl, isooctyl, isononyl and isododecyl radicals), $C_{6-12}$ cycloalkyl, such as cyclohexyl, n-alkyl- or isoalkyl-substituted cyclohexyl (such as for example methyl, ethyl, isopropyl or tert.-butyl cyclohexyl), aryl-substituted cyclohexyl (such as, for example, phenyl cyclohexyl) and cyclohexyl to which phenyl radicals are fused, aryl (such as, for example, phenyl and naphthyl), aralkyl (such as, for example, benzyl and cumenyl), alkaryl (such as, for example, methyl phenyl, isopropyl phenyl and tert.-butyl phenyl) and also cycloalkyl-substituted alkyl (such as, for example, perhydrocumenyl). Preferred $C_{6-12}$ hydrocarbon radicals are iso-$C_{6-12}$ alkyl, cycloalkyl, aryl and aralkyl, more preferably iso-$C_{8-9}$-alkyl, cyclohexyl, phenyl, cumenyl and perhydrocumenyl, most preferably 1,1,3,3-tetramethyl butyl, cyclohexyl and phenyl and, more particularly, 1,1,3,3-tetramethyl butyl.

Preferably, the $C_{6-12}$ hydrocarbon radicals, tert.-butyl and 1,1-dimethylpropyl in formulae (I) and (II) stand for the substituent $Y^2$ while the n-$C_{1-5}$-alkyls and iso-$C_{3-5}$-alkyls besides tert.-butyl and 1,1-dimethylpropyl in formulae (I) and (II) stand for the substituents $Y^1$ and $Y^3$ where the availability of the components is crucial. Where two hydrocarbon radicals and one hydrogen are present for the substituents $Y^1$, $Y^2$ and $Y^3$ in formulae (I) and (II), the hydrocarbon radicals stand for $Y^1$ and $Y^3$ where the heat resistance of the polycarbonates according to the invention is crucial. In addition, the substituents $C_{2-5}$-n-alkzyl, $C_{6-12}$-n-alkyl and $C_{6-12}$-isoalkyl, where present, preferably stand for the substituent $Y^2$ where $Y^1$ and $Y^2$ or $Y^1$, $Y^2$ and $Y^3$ in formulae (I) and (II) are hydrocarbon radicals and the heat resistance of the polycarbonates according to the invention is crucial.

Examples of bisphenols corresponding to formula (II) are
1,1-bis-(4-hydroxyphenyl)-3,4-dimethyl cyclohexane
1,1-bis-(4-hydroxyphenyl)-3,5-dimethyl cyclohexane,
1,1-bis-(4-hydroxyphenyl)-3,4,5-trimethyl cyclohexane, 1,1-bis-(4-hydroxyphenyl)-3-methyl-5-ethyl cyclohexane,
1,1-bis-(4-hydroxyphenyl)-3-methyl-5-isopropylcyclohexane, .
1,1-bis-(4-hydroxyphenyl)-3-methyl-5-tert.-butyl cyclohexane,
1,1-bis-(4-hydroxyphenyl)-4-methyl-5-tert.-butyl cyclohexane,
1,1-bis-(4-hydroxyphenyl)-3,5-di-tert.-butyl cyclohexane,
1,1-bis-(4-hydroxyphenyl)-3-methyl-4-phenyl cyclohexane,
1,1-bis-(4-hydroxyphenyl)-3-methyl-4-cyclohexyl cyclohexane,
1,1-bis-(3-methyl-4-hydroxyphenyl)-3,5-dimethyl cyclohexane,
1,1-bis-(3-chloro-4-hydroxyphenyl)-3,5-dimethyl cyclohexane,
1,1-bis-(3,5-dimethyl-4-hydroxyphenyl)-3,5-dimethyl cyclohexane,
1,1-bis-(3,5-dimethyl-4-hydroxyphenyl)-3,4-dimethyl cyclohexane,
1,1-bis-(3,5-dichloro-4-hydroxyphenyl)-3,5-dimethyl cyclohexane,
1,1-bis-(3,5-dichloro-4-hydroxyphenyl)-3,4-dimethyl cyclohexane,
1,1-bis-(3,5-dibromo-4-hydroxyphenyl)-3,5-dimethyl cyclohexane,
1,1-bis-(3,5-dibromo-4-hydroxyphenyl)-3,4-dimethyl cyclohexane.

Bisphenols corresponding to formula (II) are known or may be obtained by standard methods, for example from corresponding ketones and phenols.

In addition to the carbonate structural units corresponding to formula (I), the polycarbonates according to the invention contain other difunctional carbonte structural units, for example those corresponding to formula (III)

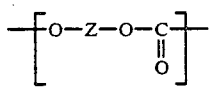

(III)

based on bisphenols corresponding to formula (IV)

HO—Z—OH    (IV)

in quantities complementary to 100 mol-%. Bisphenols corresponding to formula (IV) are those in which Z is an aromatic $C_{6-30}$ radical which may contain one or more aromatic nuclei, may be substituted and may contain aliphatic radicals or other cycloaliphatic radicals than those corresponding to formula (II) or heteroatoms as bridge members.

Examples of diphenols corresponding to formula (IV) are hydroquinone, resoroinol, dihydroxydiphenyls, bis-(hydroxyphenyl)-alkanes, bis-(hydroxyphenyl)-cycloalkanes, bis-(hydroxyphenyl)-sulfides, bis-(hydroxyphenyl)-ethers, bis-(hydroxyphenyl)-ketones, bis-(hydroxyphenyl)-sulfones, bis-(hydroxyphenyl)-sulfoxides, c,o,-bis-(hydroxyphenyl)-diisopropyl benzenes and nucleus-alkylated and nucleus-halogenated compounds thereof.

These and other suitable other diphenols are described, for example, in U.S. Pat. Nos. 3,028,365, 2,999,835, 3,148,172, 3,275,601, 2,991,273, 3,271,367, 3,062,781, 2,970,131 and 2,999,846; in DE-OSS 1 570 703, 2 063 050, 2 063 052, 2 211 956; in FR-PS 1 561 518 and in the book by H. Schnell entitled "Chemistry and Physics of Polycarbonates", Interscience Publishers, New York, 1964.

Preferred other diphenols are, for example,
4,4'-dihydroxydiphenyl,
2,2-bis-(4-hydroxyphenyl)-propane,
2,4-bis-(4-hydroxyphenyl)-2-methylbutane,
1,1-bis-(4-hydroxyphenyl)-cyclohexane,
α,α'-bis-(4-hydroxyphenyl)-p-diisopropyl benzene,
2,2-bis-(3-methyl-4-hydroxyphenyl)-propane,
2,.2-bis-(3-chloro-4-hydroxyphenyl)-propane,
bis-(3,5-dimethyl-4-hydroxyphenyl)-methane,
2,2-bis-(3,5-dimethyl-4-hydroxyphenyl)-propane,
bis-(3,5-dimethyl-4-hydroxyphenyl)-sulfone,
2,4-bis-(3,5-dimethyl-4-hydroxyphenyl)-2-methyl butane,
1,1-bis-(3,5-dimethyl-4-hydroxyphenyl)-cyclohexane,
α,α'-bis-(3,5-dimethyl-4-hydroxyphenyl)-p-diisopropyl benzene,
2,2-bis-(3,5-dichloro-4-hydroxyphenyl)-propane and
2,2-bis-(3,5-dibromo-4-hydroxyphenyl)-propane.

Particularly preferred diphenols corresponding to formula (IV) are, for example, 2,2-bis-(4-hydroxyphenyl)-propane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane and 1,1-bis-(4-hydroxyphenyl)-cyclohexane.

2,2-Bis-(4-hydroxyphenyl)-propane is especially preferred.

The other diphenols may be used both individually and in admixture.

Small quantities, preferably quantities of from 0.05 to 2.0 mol-% (based on diphenols used), of trifunctional or more than trifunctional compounds, more especially those containing three or more than three phenolic hydroxyl groups, may optionally be used in known manner as branching agents to obtain branched polycarbonates. Some of the compounds containing three or more than three phenolic hydroxyl groups which may be used as branching agents are phloroglucinol,
4,6-dimethyl-2,4,6-tri-(4-hydroxyphenyl)-hept-2-ene,
6-dimethyl-2,4,6-tri-(4-hydroxyphenyl)-heptane,
1,3,5-tri-(4-hydroxyphenyl)-benzene,
1,1,1-tri-(4-hydroxyphenyl)-ethane,
tri-(4-hydroxyphenyl)-phenylmethane,
2,2-bis-(4,4-bis-(4-hydroxyphenyl)-cyclohexyl)-propane,
2,4-bis-(4-hydroxyphenyl-isopropyl)-phenol,
2,6-bis-(2-hydroxy-5,-methyl-benzyl)-4-methylphenol,
2-(4-hydroxyphenyl)-2-(2,4-dihydroxyphenyl)-propane,
hexa-(4-(4-hydroxyphenyl-isopropyl)-phenyl)-orthoterephthalic acid ester,
tetra-(4-hydroxyphenyl)-methane,
tetra-(4-(4-hydroxyphenyl-isopropyl)-phenoxy)-methane and
1,4-bis-((4'-,4''-dihydroxytriphenyl)-methyl)-benzene.
Some of the other trifunctional compounds are 2,4-dihydroxy benzoic acid, trimesic acid, cyanuric chloride and3,3-bis-(3-methyl-4-hydroxyphenyl)-2-oxo-2,3-dihydroindole.

Monofunctional compounds are used in known manner in the usual concentrations- as chain terminators for regulating molecular weight. Suitable compounds are, for example, secondary amines, phenols and acid chlorides. Phenols, for example tert.-butyl phenols or other alkyl-substituted phenols, are preferred. Small quantities of phenols corresponding to formula (V)

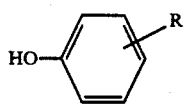

in which R is a branched $C_8$ and/or $C_9$ alkyl radical, are particularly suitable for regulating molecular weight. In the alkyl radical R, the proportion of $CH_3$ protons is preferably between 47 and 89% and the proportion of CH and $CH_2$ protons between 53 and 11%. R is preferably in the o-and/or p-position to the OH group. The particularly preferred upper limit to the ortho component is 20%.

Some particularly suitable phenols are phenol, p-tert.-butyl phenol, hydroxydiphenyl, p-cumyl phenol and, in particular, p-3,5-dimethylheptyl phenol and m- and p-1,1,3,3-tetramethyl butyl phenol. The chain terminators are generally used in quantities of from 0.1 to 10 mol-% and preferably in quantities of from 0.5 to mol-%, based on the diphenols used.

The polycarbonates according to the invention may advantageously be prepared in known manner by the interfacial process (cf. H. Schnell, "Chemistry and Physics of Polycarbonates", Polymer Reviews, Vol. IX, pages 33 et seq., Interscience Publ., 1964).

To this end, the diphenols corresponding to formula (II) are dissolved in aqueous-alkaline phase. Mixtures of diphenols corresponding to formula (II) and the other diphenols, for example those corresponding to formula (IV), are used for the production of copolycarbonates with other diphenols. Chain terminators, for example corresponding to formula (V), may be added to regulate molecular weight. The mixture is then-reacted with phosgene in the presence of an inert organic phase, which preferably dissolves polycarbonate, by the interfacial condensation method. The reaction temperature is generally in the range from 0° C. to 40° C.

The 0.05 to 2 mol-% of branching agents optionally used may either be initially introduced with the diphenols in the aqueous alkaline phase or may be added in solution in the organic solvent before the phosgenation step.

In addition to the diphenols of formula (II) and the other diphenols of formula (IV) to be used, mono- and-/or bis-chlorocarbonic acid esters thereof may also be used, being added in solution in organic solvents. In that case, the quantity of chain terminators and branching agents is determined by the mols of diphenolate structural units corresponding to formula (II) and, optionally, the other diphenolate structural units, for example those corresponding to formula (IV). In addition, where chlorocarbonic acid esters are used, the quantity of phosgene may be reduced accordingly in known manner.

The organic phase for the interfacial polycondensation and also the organic solvent for dissolving the chain terminators and, optionally, the branching agents and the chlorocarbonic acid esters may be selected, for example, from chlorinated hydrocarbons, such as chloroform, dichloroethane, di- and tetrachloroethylene, tetrachloroethane, methylene chloride, chlorobenzene and dichloro-benzene and from non-chlorinated hydrocarbons such as, for example toluene and xylene and also mixtures of these solvents, more especially mixtures of methylene chloride and chlorobenzene. The chain terminators and branching agents used may optionally be dissolved in the same solvent.

The organic phase for the interfacial polycondensation may be selected, for example, from methylene chloride, chlorobenzene or toluene and from mixtures of methylene chloride and chlorobenzene.

The aqueous alkaline phase may be formed, for example, by aqueous NaOH solution or KOH solution.

The production of the polycarbonates according to the invention by the interfacial process may be catalyzed in the usual way by such catalysts as tertiary amines and phase transfer catalysts, more especially tertiary aliphatic amines, such as for example tributylamine, triethylamine, N-ethyl piperidine, and in particular quaternary ammonium and phosphonium compounds and crown ethers, such as for example tetrabutyl ammonium bromide and triphenyl benzyl phosphonium bromide. The catalysts are generally used in quantities of from 0.05 to 30 mol-%, based on mols of diphenols used. The catalysts are generally added before the beginning of phosgenation or during or even after phosgenation.

The polycarbonates according to the invention are isolated in known manner, for example by separating off the organic phase obtained in the interfacial process with the polycarbonate dissolved therein, washing it until it is neutral and free from electrolyte and then isolating the polycarbonate as granulate, for example using an evaporation extruder, or in the form of a powder or pellets by precipitation using a non-solvent and subsequent drying or by spray evaporation.

The high molecular weight, thermoplastic aromatic polycarbonates according to the invention may also be produced by the known homogeneous-phase process (so-called "pyridine process") and by the known melt transesterification process using diphenyl carbonate for example instead of phosgene. In these cases, too, the polycarbonates according to the invention are isolated in known manner.

Typical additives for thermoplastic polycarbonates, such as for example stabilizers, mold release agents, pigments, flameproofing agents, antistatic agents, conductivity additives, fillers and reinforcing materials, may be added in the usual quantities to the polycarbonate according to the invention before or during their processing to moldings. Suitable flameproofing additives are:

1. Alkali, alkaline earth and ammonium salts of aliphatic and aromatic sulfonic acids, carboxylic acids and phosphonic acids. They may be substituted in various ways, for example by F, Cl, Br, alkyl. Salt-like flameproofing agents such as these may also be oligomeric and polymeric. Salt-like flameproofing agents are described inter alia in the following patent applications: DE-OS 1 694 640, 1 930 257, 2 049 358, 2 212 987, 2 149 311, 2 253 072, 2 703 710, 2 458 527, 2 458 968, 2 460 786, 2 460 787, 2 460 788, 2 460 935, 2 460 937, 2 460 944, 2 460 945, 2 460 946, 2 461 063, 2 461 077, 2 461 144, 2 461 145, 2 461 146, 2 644 114, 2 645 415, 2 646 120, 2 647 271, 2 648 128, 2 648 131, 2 653 327, 2 744 015, 2 744 016, 2 744 016, 2 744 017, 2 744 018, 2 745 592, 2 948 871, 2 948 439, 3 002 122.

2. Organohalogen compounds, optionally in combination with synergists, for example halogenated aromatic compounds. Substances such as these are described inter alia in the following patent applications:

DE-OS 2 631 756, JA 51-119059, DE-OS 3 342 636, EP-A 31 959, DE-OS 3 010 375, 2 631 756.

3. Halogenated phthalimides, phthalimide sulfonates: DE-OS 2 703 710, 3 203 905, 3 322 057, 3 337 857, 3 023 818.

4. Salts of halogen-containing complex acids, for example cryolite, salts of tetrafluoroboric acid and fluorosilicic acid as described inter alia in DE-OS 2 149 311, 3 023 818.

5. Partly or completely fluorinated polyolefins, as described for example in DE-OS 2 535 262, 2 915 563, 2 948 439, 3 023 818.

6. Sulfonamides, disulfonamides and salts thereof: EP-A 71 125, 14 322, WO 86/4911.

7. Elemental sulfur, red phosphorus: DE-OS 2 435 508, 2 355 211.

8. Ferrocene or derivatives thereof: DE-OS 2 644 437.

9. Diphenylsulfone DE-OS 2 129 204.

10. Nickel salts DE-OS 1 918 216.

11. Polyphenylene sulfide: DE-OS 2 503 336, EP-A 87 038.

12. Alkali and alkaline earth salts and also zinc salts of hydrochloric acid, sulfuric acid, phosphoric acid, nitric acid, hydrogen sulfide, boric acid and also acidic salts of these acids WO 87/542, US 4,408,005, EP-A 174 684.

13. Siloxanes: DE-OS 2 535 261.

Comonomers which may be used for flameproofing include

1. Chlorinated and brominated BPA and also 4,4'-dihydroxydiphenyl sulfide: EP-A 31 958, 61 060.

2. Siloxane blocks: DE-OS 3 334 782.

3. Dihydroxydiphenyl sulfones: US-PS 3,912,688.

4. Sulfoanilide terminal groups: EP-A 82 483.

The flameproofing agents may be used individually or together.

The flameproofing additives are incorporated individually or in combination in the polycarbonates containing diphenols corresponding to formula I, preferably in extruders or kneaders. In many cases, the flameproofing agents may be added to the polycarbonates during their preparation or even to the starting materials. In addition, the flameproofing agents may also be added to solutions of the polycarbonates with subsequent concentration of the solutions to dryness. The flameproofing additives are preferably used in quantities of from 0.001 to 50% by weight while the flameproofing comonomers are preferably used in quantities of from 0.1 to 50 mol-%.

Other suitable additives are, for example, graphite, carbon black, metal fibers, metal powders, kieselguhr, quartz, talcum, mica, kaolin, clays, $CaF_2$, $CaCO_3$, aluminium oxides, glass fibers, carbon fibers, ceramic fibers, organic and inorganic pigments and mold release agents such as, for example, glycerol stearates, pentaerythritol tetrastearate and trimethylol propane tristearate.

The polycarbonates according to the invention may be processed to moldings by any of the methods normally used for thermoplastics, for example by extruding the polycarbonates isolated in known manner to granulate and processing the granulate in known manner, for example by injection molding, extrusion, blow molding, rotomolding or hot press molding, to form various moldings, optionally after addition of the above-mentioned additives. Moldings are also understood to include fibers, sheets, films. Films may also be further processed by thermoforming. The films may be processed with other films to form composite films. The polycarbonates according to the invention may also be used in other composite materials, for example in combination with fibers and other polymers.

The polycarbonates according to the invention may be used with advantage as moldings in the electrical field and in the building field, particularly where complicated components of high heat resistance are required.

EXAMPLE 1

Polycarbonate of 1,1-bis-(4-hydroxyphenyl)-3,5-dimethyl cyclohexane 184 g (4.6 mOl) NaOH and 296 g (1 mol) 1,1-bis-(4-hydroxyphenyl)-3,5-dimethyl cyclohexane were dissolved in 3 l water. 3 l methylene chloride with 6.8 g (0.033 mol) 4-(1,1,3,3-t®tramethyl)-butyl phenol dissolved therein were added to the resulting solution. 148.5 g (1.5 mol) phosgene were introduced into the mixture with vigorous stirring over a period of 30 minutes at 25° C. After addition of 1.13 g (0.01 mol) N-ethyl piperidine, the mixture was intensively stirred for 60 minutes at 25° C. The bisphenolate-free alkaline-aqueous phase was separated off. After acidification with dilute phosphoric acid, the organic phase was washed with water until free from electrolyte and then concentrated by evaporation. The polycarbonate obtained was then freed from residual methylene chloride by drying. It was colorless and had a relative viscosity $\eta_{rel}$ of 1.326 (as measured in dichloromethane at 25° C., c=5 g polycarbonate/1 solution). The glass temperature Tg (according to differential thermoanalysis) was 229° C.

EXAMPLE 2

Polycarbonate of 1,1-bis-(4-hydroxyphenyl)-3,4-dimethyl cyclohexane

The procedure was as in Example 1, except that 296 g (1 mol) 1,1-bis-(4-hydroxyphenyl)-3,4-dimethyl cyclohexane were used instead of the bisphenol of Example 1.

The polycarbonate obtained had a relative viscosity of 1.331 (as measured in dichloromethane at 25° C., c=5 g polycarbonate/1 solution). The glass temperature Tg (according to differential thermoanalysis) was 213° C.

EXAMPLE 3

Copolymer of bisphenol A and 1,1-bis-(4-hydroxyphenyl)-3,5-dimethyl cyclohexane in a molar ratio of 1:1

The procedure was as in Example 1, except that half the bisphenol used there was replaced by 114 g (0.5 mol) 2,2-bis-(4-hydroxyphenyl)-propane (bisphenol A).

The polycarbonate obtained had a relative viscosity $\eta_{rel}$ of 1.301 (as measured in dichloromethane at 25° C., c=5 g polycarbonate/1 solution). The glass temperature Tg (according to differential thermoanalysis) was 196° C.

EXAMPLE 4

Polycarbonate of 1,1-bis-(4-hydroxyphenyl)-3-methyl-5-isopropyl cyclohexane

The procedure was as in Example 2, except that 324 g (1 mol) 1,1-bis-(4-hydroxyphenyl)-3-methyl-5-isopropyl cyclohexane were used instead of the bisphenol of Example 2.

The polycarbonate obtained had a relative viscosity of 1.319 (as measured in dichloromethane at 25° C., c=5 g polycarbonate/l solution). The glass temperature Tg (according to differential thermoanalysis) was 234° C.

EXAMPLE 5

Polycarbonate of 1,1-bis-(4-hydroxyphenyl)-3-methyl-4-phenyl cyclohexane

The procedure was as in Example 2, except that 358 g (1 mol) 1,1-bis-(4-hydroxyphenyl)-3-methyl-4-phenyl cyclohexane were used instead of the bisphenol of Example 2.

The polycarbonate obtained had a relative viscosity of 1.332 (as measured in dichloromethane at 25° C., c=5 g polycarbonate/l solution). The glass temperature Tg (according to differential thermoanalysis) was 239° C.

EXAMPLE 6

The procedure was as in Example A, except that 10 mol-% of the diphenol was replaced by 3,3',5,5'-tetrabromobisphenol A. The polycarbonate obtained had a relative viscosity $\eta_{rel}$ of 1.302.

EXAMPLES 7–46

The results of the fire tests of the flameproofed polycarbonates are shown in Table 1. The flameproofing agents were incorporated in a Werner & Pfleiderer ZSK 32 twin-screw extruder.

Burning behavior was evaluated on the basis of the $O_2$ index according to ASTM-D 2863-70. Test specimens measuring 80×6×3 mm were made by injection molding for these tests.

TABLE 1

| Example | Polycarbonate of Example | Flameproofing agent | Quantity, % | $O_2$ Index, % |
|---|---|---|---|---|
| 7 (Comp.) | 1 | — | — | 23.8 |
| 8 (Comp.) | 2 | — | — | 24.3 |
| 9 (Comp.) | 3 | — | — | 24.9 |
| 10 | 6 | — | — | 28.7 |
| 11 | 1 | K-p-toluene sulfonate | 0.2 | 28.0 |
| 12 | 2 | " | " | 28.7 |
| 13 | 3 | " | " | 28.2 |
| 14 | 6 | " | " | 33.6 |
|  |  | " | " | 31.0 |
| 15 | 1 | Perfluoro-n-butane K-sulfonate | " | 29.3 |
| 16 | 2 | $CF_3-CO_2-Ca-O_2C-CF_3$ | " | 28.7 |
| 17 | 1 | 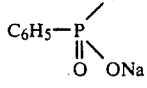 | " | 29.3 |
| 18 | 1 | 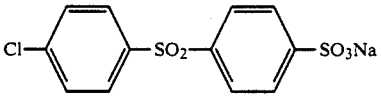 | " | 30.5 |
| 19 | 3 | " | " | 30.8 |
| 20 | 1 | Decabromodiphenyl | 5 | 28.8 |
| 21 | 2 | Decabromodiphenyl | 5 | 29.9 |
| 22 | 1 | Decabromodiphenyl + $Sb_2O_3$ | 5 + 2 | 31.6 |
| 23 | 1 | 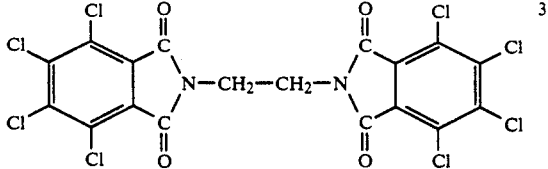 | 3 | 30.4 |
| 24 | 1 | $Na_3AlF_6$ | 0.2 | 29.3 |
| 25 | 3 | $Na_3AlF_6$ | 0.2 | 30.4 |
| 26 | 3 | $Na_3AlF_6$ + polytetrafluoroethylene as Ex. 27 | 0.2 + 0.1 | 33.5 |
| 27 | 3 | Polytetrafluoroethylene, Hostaflon 1740 (Hoechst AG) | 0.2 | 26.5 |
| 28 | 1 |  | 0.2 | 26.8 |
| 29 | 1 | 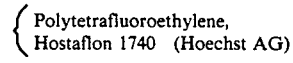 | 0.4 | 29.3 |
| 30 | 1 | Sulfur | 5 | 30.3 |
| 31 | 1 | Red phosphorus, mean particle diameter 35 μm | 5 | 35.2 |
| 32 | 1 | Red phosphorus, mean particle diameter 35 μm | 5 | 35.8 |
|  |  | Ferrocene, mean particle diameter 28 μm | 0.1 | 27.5 |
| 33 | 1 | Diphenyl sulfone | 3 | 27.2 |
| 34 | 1 | Ni laurate | 0.02 | 27.5 |

TABLE 1-continued

| Example | Polycarbonate of Example | Flameproofing agent | Quantity, % | $O_2$ Index, % |
|---|---|---|---|---|
| 35 | 1 | Polyphenylene sulfide according to EP-A 171 021 (melt viscosity 53 Pa.s at a shear rate of 100 Pa/306° C.) | 10 | 31.2 |
| 36 | 3 | | 10 | 31.8 |
| 37 | 1 | $K_2HPO_4$ | 0.2 | 28.3 |
| 38 | 1 | $Li_2SO_4$ | 0.2 | 27.5 |
| 39 | 1 | $NaNO_3$ | 0.2 | 29.9 |
| 40 | 1 | ZnS | 0.5 | 28.2 |
| 41 | 3 | ZnS | 0.5 | 28.8 |
| 42 | 1 | NaHS | 0.2 | 27.1 |
| 43 | 1 | $Na_3B_4O_7$ | 0.2 | 28.4 |
| 44 | 1 | Polydimethyl siloxane (viscosity 170,000 mPa.s) | 7 | 28.9 |
| 45 | 1 | Polysiloxane block copolymer of Example 3 of DE-OS 3 334 782 | 50 | 28.8 |
| 46 | 2 | K salt of perfluoro-n-butane sulfonic acid + polytetrafluoroethylene (Example 27) | 0.2 + 0.1 | 33.6 |

We claim:

1. A molding composition comprising a thermoplastic aromatic polycarbonate resin having a weight average molecular weight of at least 10,000 comprising bifunctional carbonate structural units corresponding to

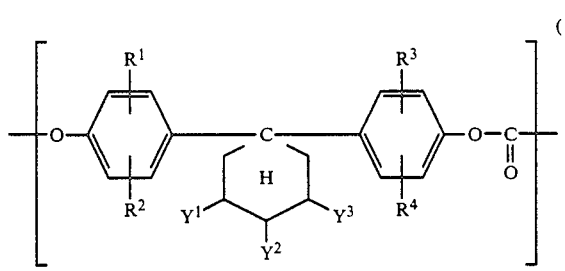 (1)

in which

R$^1$, R$^2$, R$^3$, R$^4$ independent of one another represent hydrogen, a C$_{1-12}$ hydrocarbon radical or a halogen atom Y$^1$, Y$^2$, Y$^3$ independently of one another represent hydrogen, C$_{1-15}$ alkyl, or a C$_{6-12}$ hydrocarbon radical, at least two of the substituents Y$^1$, Y$^2$ and Y$^3$ being other than hydrogen and at least one of the substituents Y$^1$, Y$^2$ and Y$^3$ being C$_{1-5}$ alkyl, in quantities of from 100 to 1 mol-%, based on the total quantity of difunctional carbonate structural units in the polycarbonate.

2. The composition of claim 1 wherein said difunctional carbonate structural units comprise units corresponding to

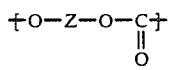

wherein Z is a C$_{6-30}$ aromatic radical.

3. The composition of claim 1 further comprising at least one member selected from the group consisting of stabilizers, mold release agents, pigments, flameproof agents, antistatic agents, conductivity increasing agents, fillers and reinforcing agents.